No. 817,110. PATENTED APR. 3, 1906.
J. L. FRUIN.
COMBINED PLUMBER'S FITTING AND PIPE SUPPORT.
APPLICATION FILED MAR. 13, 1905.
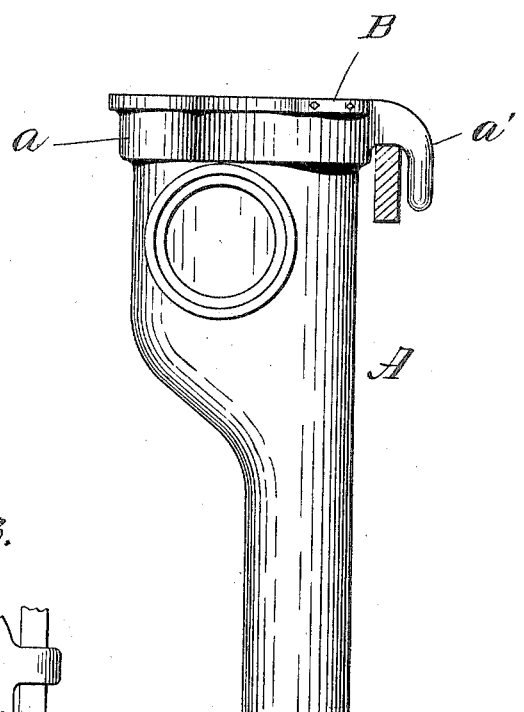
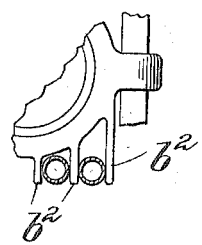
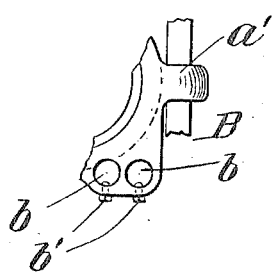
Attest:
Edgeworth Greene
C. B. Barker
Inventor:
John L. Fruin,
by F. W. Barker, Atty.

UNITED STATES PATENT OFFICE.

JOHN L. FRUIN, OF NEW YORK, N. Y.

COMBINED PLUMBER'S FITTING AND PIPE-SUPPORT.

No. 817,110.  Specification of Letters Patent.  Patented April 3, 1906.

Application filed March 13, 1905. Serial No. 249,856.

*To all whom it may concern:*

Be it known that I, JOHN L. FRUIN, a citizen of the United States, and a resident of the borough of Brooklyn, New York city, New York State, have invented a new and useful Improvement in a Combined Plumber's Fitting and Pipe-Support, of which the following is a specification.

This invention relates to means in conjunction with a plumber's fitting, whereby the weight thereof and of other members of a plumbing system may be sustained by a joist, cross-beam, pipe, or other convenient article of the building structure wherein the plumbing system of which the aforesaid fitting is a member is installed.

My invention further includes means in conjunction with a plumber's fitting whereby the hot and cold water pipes of a building may be conveniently localized and supported.

In the drawings accompanying this application, Figure 1 is an elevation of a combined waste and vent fitting, and Figs. 2 and 3 are respectively partial detail top plan views thereof.

In said views, A indicates the fitting having the hub $a$, from which extends an integral downwardly-turned hook $a'$, said hook being adapted to fit over a horizontally-arranged joist, pipe, or the like, and thereby sustain the weight of the fitting. Also extending from the hub $a$ is a flange or integral projection or plate B, having one or more holes therethrough, as $b\ b$, said holes being adapted to receive pipes, as hot and cold water pipes, to localize the same and form a convenient means of support therefor. The edge of the plate B may be tapped to permit the use of set-screws $b'\ b'$ for securing the pipes within the holes $b\ b$.

Realizing that the space within partitions, &c., in buildings for containing the plumbing-pipes, hot and cold water pipes, &c., is circumscribed, it will be seen that the means of supporting hot and cold water pipes herein shown is extremely compact and is besides very conveniently employed, hence serving a useful purpose.

I do not wish to limit myself to the use of the abutment or plate B, having holes to receive and localize adjacent pipes, as I am aware that other means may be employed to serve the same function—as, for example, that illustrated in Fig. 3, wherein is shown a series of projecting lugs $b^2$, between which the pipes to be sustained in position may be placed.

Having now described my invention, I declare that what I claim is—

1. As a new article of manufacture, a plumber's fitting composed of a metal casting having waste and vent apertures, and having a peripheral flange, and, extending therefrom, a projection with means for removably, and securely, supporting external pipes.

2. As a new article of manufacture, a plumber's fitting composed of a metal casting having waste and vent apertures, and having a peripheral flange, and, extending therefrom, a sustaining-hook; and a projection also extending from said flange with means for removably, and securely, supporting external pipes.

JOHN L. FRUIN.

Witnesses:
 FREDERICK C. BONNY,
 F. W. BARKER.